US011639409B2

(12) United States Patent
Yan

(10) Patent No.: US 11,639,409 B2
(45) Date of Patent: May 2, 2023

(54) TERMINAL-FUNCTIONALIZED POLYMER, RUBBER COMPOSITION CONTAINING SAME AND RELATED PROCESSES

(71) Applicant: Bridgestone Corporation, Chuo-ku (JP)

(72) Inventor: Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 44 days.

(21) Appl. No.: 17/340,588

(22) Filed: Jun. 7, 2021

(65) Prior Publication Data
US 2021/0292522 A1 Sep. 23, 2021

Related U.S. Application Data

(62) Division of application No. 16/094,808, filed as application No. PCT/US2017/028522 on Apr. 20, 2017, now Pat. No. 11,028,208.

(Continued)

(51) Int. Cl.
| C08F 257/02 | (2006.01) |
| C08C 19/25 | (2006.01) |
| C08C 19/28 | (2006.01) |
| C08F 236/10 | (2006.01) |
| C08K 3/04 | (2006.01) |
| C08K 3/36 | (2006.01) |
| C08L 15/00 | (2006.01) |
| C08K 5/18 | (2006.01) |
| C08L 91/00 | (2006.01) |
| C08L 47/00 | (2006.01) |
| C08K 3/22 | (2006.01) |
| C08K 5/47 | (2006.01) |
| C08C 19/44 | (2006.01) |
| C08L 101/10 | (2006.01) |
| C08L 7/00 | (2006.01) |
| C08K 5/09 | (2006.01) |
| C08K 5/31 | (2006.01) |
| C08K 3/06 | (2006.01) |
| C08L 91/06 | (2006.01) |
| C08F 236/08 | (2006.01) |
| C08K 5/5419 | (2006.01) |
| C08K 5/5425 | (2006.01) |
| C08L 9/06 | (2006.01) |
| C08L 25/06 | (2006.01) |
| C08F 236/06 | (2006.01) |
| C08F 279/02 | (2006.01) |
| B60C 1/00 | (2006.01) |

(52) U.S. Cl.
CPC ............ *C08F 257/02* (2013.01); *C08C 19/25* (2013.01); *C08C 19/28* (2013.01); *C08C 19/44* (2013.01); *C08F 236/06* (2013.01); *C08F 236/08* (2013.01); *C08F 236/10* (2013.01); *C08F 279/02* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/5419* (2013.01); *C08K 5/5425* (2013.01); *C08L 7/00* (2013.01); *C08L 9/06* (2013.01); *C08L 15/00* (2013.01); *C08L 25/06* (2013.01); *C08L 47/00* (2013.01); *C08L 91/00* (2013.01); *C08L 91/06* (2013.01); *C08L 101/10* (2013.01); *B60C 1/0016* (2013.01); *C08F 2810/40* (2013.01); *C08L 2205/02* (2013.01); *C08L 2310/00* (2013.01)

(58) Field of Classification Search
CPC .... C08F 257/02; C08F 236/06; C08F 236/10; C08F 236/08; C08K 3/04; C08K 3/36; C08K 5/18; C08K 3/22; C08K 5/47; C08K 5/09; C08K 5/31; C08K 3/06; C08K 5/5419; C08K 5/5425; C08L 9/06; C08L 15/00; C08L 25/06; C08L 91/00; C08L 47/00; C08L 101/10; C08L 7/00; C08L 91/06; C08C 19/25; C08C 19/28; C08C 19/44

See application file for complete search history.

(56) References Cited

U.S. PATENT DOCUMENTS 5,326,895 A 7/1994 Kubota et al.
5,500,482 A * 3/1996 Muraki ................. C08L 7/00
525/98
5,700,874 A 12/1997 Takeichi et al.
(Continued)

FOREIGN PATENT DOCUMENTS

EP 890580 A1 * 1/1999 ........... B60C 1/0016
EP 890580 A1 1/1999
(Continued)

OTHER PUBLICATIONS

Extended European search report and opinion from application EP 17786609.2 dated Nov. 11, 2019.
International Preliminary Report on Patentability and Written Opinion from PCT/US2017/028522 dated Oct. 23, 2018.
International Search Report from PCT/US2017/028522 dated Jul. 26, 2017.
P-styryltrimethoxysilane from Gelest, downloaded on Dec. 2, 2020 from https://www.gelest.com/product/SIS6994.6/.

*Primary Examiner* — John E Uselding
(74) *Attorney, Agent, or Firm* — Meredith E. Hooker; Jenny L. Sheaffer

(57) ABSTRACT

Disclosed herein are a terminal-functionalized polymer, rubber compositions containing the polymer, and related processes for preparing the polymer. The functionalizing compound used to prepare the terminal-functionalized polymer has a specified formula which includes a silicon atom and a moiety containing at least two carbon-carbon double bonds in a conjugated configuration.

20 Claims, No Drawings

Related U.S. Application Data

(60) Provisional application No. 62/325,552, filed on Apr. 21, 2016.

(56) References Cited

U.S. PATENT DOCUMENTS

| | | |
|---|---|---|
| 5,939,471 A | 8/1999 | Watanabe et al. |
| 6,008,295 A | 12/1999 | Takeichi et al. |
| 6,518,350 B1 | 2/2003 | Kobayashi et al. |
| 6,590,018 B2 | 7/2003 | Musa |
| 6,767,642 B2 | 7/2004 | Paquet, Jr. et al. |
| 6,797,762 B2 | 9/2004 | Agostini et al. |
| 7,687,572 B2 | 3/2010 | Hochi |
| 8,415,435 B2 | 4/2013 | Oshima et al. |
| 8,759,432 B2 | 6/2014 | Hattori et al. |
| 8,859,657 B2 | 10/2014 | Minagawa et al. |
| 9,034,962 B2 | 5/2015 | Lin et al. |
| 2003/0019554 A1 | 1/2003 | Agostini et al. |
| 2006/0025506 A1 | 2/2006 | Weller et al. |
| 2006/0173145 A1 | 8/2006 | Pawlow et al. |
| 2010/0056710 A1 | 3/2010 | Oshima |
| 2011/0178198 A1 | 7/2011 | Backer et al. |
| 2012/0165476 A1 | 6/2012 | Hogan et al. |
| 2012/0225233 A1 | 9/2012 | Guy et al. |
| 2014/0102332 A1 | 4/2014 | Yoo et al. |
| 2015/0065639 A1 | 3/2015 | Na et al. |

FOREIGN PATENT DOCUMENTS

| | | | |
|---|---|---|---|
| EP | 1072442 A1 | 1/2001 | |
| WO | 2011/083048 A1 | 7/2011 | |
| WO | WO-2015043660 A1 * | 4/2015 | ............ C08C 19/25 |
| WO | 2015/089356 A2 | 6/2015 | |

\* cited by examiner

TERMINAL-FUNCTIONALIZED POLYMER, RUBBER COMPOSITION CONTAINING SAME AND RELATED PROCESSES

CROSS-REFERENCE TO RELATED APPLICATIONS

This application is a divisional of U.S. application Ser. No. 16/094,808, filed Oct. 18, 2018, and assigned U.S. Pat. No. 11,028,208 and an issue date of Jun. 8, 2021, which is a U.S. national stage of International Application Number PCT/US2017/028522, filed on Apr. 20, 2017, which application claims priority to and any other benefit of U.S. Provisional Patent Application Ser. No. 62/325,552, filed Apr. 21, 2016, and entitled "TERMINAL-FUNCTIONALIZED POLYMER, RUBBER COMPOSITION CONTAINING SAME AND RELATED PROCESSES," the entire disclosure of each of which is incorporated by reference herein.

FIELD

The present application is directed to a terminal-functionalized polymer, rubber compositions containing the polymer, and related processes for preparing the polymer.

BACKGROUND

Rubber compositions utilized in various tire components such as tire treads are frequently reinforced with fillers such as carbon black and/or silica. While the use of silica filler may lead to a desirable decrease in rolling resistance (which is generally associated with improved fuel economy), silica fillers can be difficult to disperse within the rubber composition.

SUMMARY

Disclosed herein are a terminal-functionalized polymer, rubber compositions containing the polymer, and related processes for preparing the polymer.

In a first embodiment, a terminal-functionalized polymer having a structure according to formula I: $(P)_n Si(R)_k (OR)_m$—SP—U is disclosed. According to formula I, P is a polymer chain comprising at least one type of conjugated diene monomer and optionally at least one type of vinyl aromatic monomer; n is an integer of 1-3; m is an integer of 0-2; k is an integer of 0 or 1, m+n+k=3; each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv); SP is a spacer group having at least two carbon atoms and is optionally substituted with at least one heteroatom selected from S, O, or NR; and U is a moiety containing at least two carbon-carbon double bonds in a conjugated configuration and is optionally substituted with at least one heteroatom selected from O, S, or N.

In a second embodiment, a rubber composition is disclosed. According to the second embodiments, the rubber composition comprises: (a) up to 100 parts of the terminal-functionalized polymer of the first embodiment, and (b) 5 to 200 phr of at least one reinforcing filler comprising at least one of carbon black or silica.

In a third embodiment, a process for preparing a terminal-functionalized polymer is disclosed. According to the third embodiment, the process comprises reacting the live end of a polymer chain with a functionalizing compound having formula II: $(OR)_o Si(R)_p$—SP—U, wherein the polymer chain comprises at least one type of conjugated diene monomer and optionally at least one type of vinyl aromatic monomer. According to formula II, o is an integer of 2-3; p is an integer of 0-1; o+p=3; each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv); SP is a spacer group having at least two carbon atoms and is optionally substituted with at least one heteroatom selected from S, O, or NR; and U is a moiety containing at least two carbon-carbon double bonds in a conjugated configuration and is optionally substituted with at least one heteroatom selected from O, S, or N.

DETAILED DESCRIPTION

Disclosed herein are a terminal-functionalized polymer, rubber compositions containing the polymer, and related processes for preparing the polymer.

In a first embodiment, a terminal-functionalized polymer having a structure according to formula I: $(P)_n Si(R)_k (OR)_m$—SP—U is disclosed. According to formula I, P is a polymer chain comprising at least one type of conjugated diene monomer and optionally at least one type vinyl aromatic monomer; n is an integer of 1-3; m is an integer of 0-2; k is an integer of 0 or 1; m+n+k=3; each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv); SP is a spacer group having at least two carbon atoms and is optionally substituted with at least one heteroatom selected from S, O, or NR; and U is a moiety containing at least two carbon-carbon double bonds in a conjugated configuration and is optionally substituted with at least one heteroatom selected from O, S, or N.

In a second embodiment, a rubber composition is disclosed. According to the second embodiments, the rubber composition comprises: (a) up to 100 parts of the terminal-functionalized polymer of the first embodiment, and (b) 5 to 200 phr of at least one reinforcing filler comprising at least one of carbon black or silica.

In a third embodiment, a process for preparing a terminal-functionalized polymer is disclosed. According to the third embodiment, the process comprises reacting the live end of a polymer chain with a functionalizing compound having formula II: $(OR)_o Si(R)_p$—SP—U, wherein the polymer chain comprises at least one type of conjugated diene monomer and optionally at least one type of vinyl aromatic monomer. According to formula II, o is an integer of 2-3; p is an integer of 0-1; o+p=3; each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv); SP is a spacer group having at least two carbon atoms and is optionally substituted with at least one heteroatom selected from S, O or NR; and U is a moiety containing at least two carbon-carbon double bonds in a conjugated configuration and is optionally substituted with at least one heteroatom selected from O, S, or N.

Definitions

As used herein, the phrases "functionalized polymer" and "functional polymer" as well as related terms such as functionalizing and functionalized are meant to encompass polymers having at least one functional group bonded to the end of a polymer chain. As described further herein, the at least one functional group according to the first-third embodiments described herein contains silicon and the end of the polymer chain is directly bonded to the silicon of the functional group.

As used herein, the term "live end" (e.g., live end of a polymer chain) is used to refer to a polymer species having a living end that has not yet been terminated; the living end is capable of reacting with a functionalizing compound and, thus, can be described as reactive.

As used herein, the term "moiety" is used to refer to a group formed by removal of one or more hydrogens from a hydrocarbon. The term "hydrocarbon" is used herein to refer to a compound containing a carbon backbone and formed from hydrogen and carbon, although as discussed further herein certain of the hydrocarbon groups herein may be substituted with (i.e., contain or comprise) one or more heteroatoms.

As used herein, the term "natural rubber" means naturally occurring rubber such as can be harvested from sources such as *Hevea* rubber trees and non-*Hevea* sources (e.g., guayule shrubs and dandelions such as TKS). In other words, the term "natural rubber" should be construed so as to exclude synthetic polyisoprene.

As used herein, the term "phr" means parts per one hundred parts rubber. The 100 parts rubber refers to 100 parts of the elastomer.

As used herein the term "polyisoprene" means synthetic polyisoprene. In other words, the term is used to indicate a polymer that is manufactured from isoprene monomers, and should not be construed as including naturally occurring rubber (e.g., *Hevea* natural rubber, guayule-sourced natural rubber, or dandelion-sourced natural rubber). However, the term polyisoprene should be construed as including polyisoprenes manufactured from natural sources of isoprene monomer.

As used herein, the term "polymer" is meant to encompass both polymers (i.e., containing repeating units from one monomer) and copolymers (i.e., containing repeating units from two or more monomers).

Functionalizing Compound Having Formula II and Polymer Having Formula I

As discussed above, the process of the third embodiment comprises reacting the live end of a polymer chain with a functionalizing compound having formula II: $(OR)_o Si(R)_p$—SP—U, wherein o is an integer of 2-3, p is an integer of 0-1, o+p=3, each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv); SP is a spacer group having at least two carbon atoms and is optionally substituted with at least one heteroatom selected from S, O, or NR; and U is a moiety containing at least two carbon-carbon double bonds in a conjugated configuration and is optionally substituted with at least one heteroatom selected from O, S, or N. As also discussed above, according to the process of the third embodiment, the polymer chain comprises at least one type of conjugated diene monomer and optionally at least one type of vinyl aromatic monomer. As should be apparent from a review of formula II, the functionalizing compound contains Si that is bonded to 2-3 OR moieties (the number of OR moieties is represented by o) and the Si is also bonded to 0-1 R moieties (the number of R moieties is represented by p). It should be understood that for the OR moieties, the Si is directly bonded to the O of the OR, i.e., Si—O—R. The Si is also directly bonded to SP which is used to represent a spacing group that separates the Si and the U moiety. The U moiety contains at least two carbon-carbon double bonds in a conjugated configuration. The U moiety is optionally substituted with at least one heteroatom selected from O, S, or N.

Reaction of the functionalizing compound having formula II with the live end of a polymer chain results in a terminal-functionalized polymer having a structure according to formula I: $(P)_n Si(R)_k (OR)_m$—SP—U. As those of skill in the art should recognize, the functionalizing compound of formula II bonds to the live end of the polymer chain via the Si (in the formula II compound) resulting in loss of at least one OR moiety from the functionalizing compound. In other words, the end of the polymer chain is directly bonded to the Si of the functionalizing compound. For example, if one polymer chain is present in formula I, this can be understood to have resulted from the loss of one OR moiety from functionalizing compound II and if two polymer chains are present in formula I, this can be understood to have resulted from the loss of two OR moieties from functionalizing compound II. Since both of formulas I and II contain moieties including R, OR, SP and U, the below discussion of these moieties should be understood to apply equally to both formulas, and, thus, to each of the first-third embodiments disclosed herein.

OR Moiety and R Moiety

The OR moiety or moieties (when present) as well as the R moiety or moieties (when present) of formulas I and II are each bonded to the Si within formula I or II, respectively. As discussed above, for each R moiety and/or OR moiety that is present in the functionalizing compound of formula II or the terminal-functionalized polymer of formula I, each R may be independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv). By stating that in option (v) that R is selected from $SiR^1R^2R^3$ where each of $R^1$, $R^2$ and $R^3$ is independently selected from H, (i), (ii), (iii), or (iv) is meant that each of $R^1$, $R^2$ and $R^3$ is independently selected from H, an alkyl group having 1 to 20 carbons, a cycloalkyl group having 3 to 20 carbons, an aryl group having 6 to 20 carbons, or an alkylaryl group having 7 to 20 carbons. In certain embodiments of the first-third embodiments, each R in every OR present in formula I or II is the same. In other embodiments of the first-third embodiments, each R in every OR present in formula I or II is not the same. In certain embodiments of the first-third embodiments, each R present in formula I or II is the same. In other embodiments of the first-third embodiments, each R in every R present in formula I or II is not the same.

In those embodiments of the first-third embodiments wherein the R of an OR moiety is independently selected from an alkyl group having 1 to 20 carbons (e.g., 1, 2, 3, 4, 5, 6, 7, 8, 9, 10, 11, 12, 13, 14, 15, 16, 17, 18, 19, or 20), the alkyl group preferably has 1 to 10 carbon atoms, even more preferably 1 to 8 carbon atoms, or 1 to 4 carbon atoms. The alkyl group may be linear (e.g., n-butyl) or branched (e.g., iso-butyl). In certain embodiments of the first-third embodiments, the R of an OR moiety is independently selected from an alkyl group having 1 to 20 carbon atoms.

In those embodiments of the first-third embodiments wherein the R of an OR moiety is independently selected from a cycloalkyl group having 3 to 20 carbons (e.g., 3, 4, 5, 6, 7, 8, 9, 10, 11, 12, 13, 14, 15, 16, 17, 18, 19, or 20), the cycloalkyl group preferably has 3 to 12 carbon atoms, even more preferably 3 to 10 carbon atoms. The cycloalkyl group may be entirely comprised of carbon atoms in one or more cyclic rings, or alternatively may be comprised of carbon atoms in one or more cyclic rings substituted with one or more alkyl groups (e.g., C1 to C4 alkyl groups). In certain embodiments of the first-third embodiments, the R of an OR moiety is independently selected from a cycloalkyl group having 3 to 20 carbons. Non-limiting examples of the cycloalkyl group include cyclopropyl, cyclobutyl, cyclopentyl, and cyclohexyl.

In those embodiments of the first-third embodiments wherein the R of an OR moiety is independently selected from an aryl group having 6 to 20 carbons (e.g., 6, 7, 8, 9, 10, 11, 12, 13, 14, 15, 16, 17, 18, 19, or 20), the aryl group preferably has 6 to 16 carbon atoms, even more preferably 6 to 14 carbon atoms. In certain embodiments of the first-third embodiments, the R of the OR moiety is independently selected from an aryl group having 6 to 20 carbons. Non-limiting examples of the aryl group including phenyl, naphthyl, and biphenyl.

In those embodiments of the first-third embodiments wherein the R of an OR moiety is independently selected from an alkylaryl group having 7 to 20 carbons, the alkylaryl group preferably has 7 to 18 carbons, even more preferably 7 to 12 carbons. The alkylaryl group is an aryl group substituted with an alkyl, non-limiting examples of which include methyl benzene. Within the OR moiety when R comprises alkylaryl, the aromatic ring may be directed bonded to the oxygen or the substituent (alkyl) of the R may be bonded directly to the oxygen. In certain embodiments of the first-third embodiments, the R of an OR moiety is independently selected from an alkylaryl group having 7 to 20 carbons.

In those embodiments of the first-third embodiments wherein the R of an OR moiety is independently selected from $SiR^1R^2R^3$ and each of $R^1$, $R^2$ and $R^3$ is independently selected from H, an alkyl group having 1 to 20 carbons, a cycloalkyl group having 3 to 20 carbons, an aryl group having 6 to 20 carbons, or an alkylaryl group having 7 to 20 carbons, each of $R^1$, $R^2$ and $R^3$ is preferably selected from H or an alkyl group having 1 to 20 carbon atoms, preferably 1 to 10 carbon atoms, even more preferably 1 to 8 carbon atoms or 1 to 4 carbon atoms. In certain embodiments of the first-third embodiments, the R of an OR moiety is independently selected from $SiR^1R^2R^3$ and each of $R^1$, $R^2$ and $R^3$ is independently selected from H, an alkyl group having 1 to 20 carbons, a cycloalkyl group having 3 to 20 carbons, an alkyl group having 6 to 20 carbons, or an alkylaryl group having 7 to 20 carbons, each of $R^1$, $R^2$ and $R^3$ is preferably selected from H or an alkyl group having 1 to 20 carbon atoms.

SP (Spacer Group)

As discussed above, each of formulas I and II includes SP as a spacer group separating the Si atom and the U moiety. According to the first-third embodiments, SP has at least two carbon atoms and is optionally substituted with at least one heteroatom selected from S (sulfur), O (oxygen) and NR. NR is used to indicate a protected nitrogen atom, i.e., N with R bonded thereto. R of NR has the definition as discussed above, but is preferably an alkyl group having 1 to 10, 1 to 6, or 1 to 4 carbons. When SP is substituted with at least one heteroatom, the Si in formula I or II is directly bonded to one of the carbons of SP rather than to S or the N of NR. When SP is substituted with a sulfur, the sulfur may be between two carbons in the SP moiety, e.g., —C—S—C—. According to the first-third embodiments, SP preferably has 2-20 carbon atoms (e.g., 2, 3, 4, 5, 6, 7, 8, 9, 10, 11, 12, 13, 14, 15, 16, 17, 18, 19, or 20), even more preferably 2-10 carbon atoms. According to the first-third embodiments, the carbon atoms of SP may be linear or branched. According to the first-third embodiments, SP can be aliphatic (e.g., a divalent radical derived from an alkane) or aryl (e.g., having 6 to 20 carbon atoms such as phenyl, naphthyl, and biphenyl). In certain embodiments of the first-third embodiments, SP has at least two carbon atoms (e.g., 2-20 or 2-10) and contains no heteroatoms. In other embodiments of the first-third embodiments, SP has at least two carbon atoms (e.g., 2-20 or 2-10) and contains at least one heteroatom selected from S, O, or NR.

U Moiety

As discussed above, each of formulas I and II includes a U moiety containing at least two carbon-carbon double bonds in a conjugated configuration which is optionally substituted with at least one heteroatom selected from O, S, or N. As those of skill in the art will understand, a conjugated configuration for carbon-carbon double bonds refers to two double carbon-carbon bonds (i.e., two —C═C— bonds) that are separated by a single bond (i.e., —C—C—); thus, a moiety or compound containing at least two carbon-carbon double bonds in a conjugated configuration will contain at least one —C═C—C═C— moiety. By stating that the U moiety contains at least two carbon-carbon double bonds in a conjugated configuration is meant that the U moiety may contain two carbon-carbon double bonds in a conjugated fashion (i.e., —C═C—C═C—) or more than two carbon-carbon double bonds in a conjugated fashion (e.g., three such as —C═C—C═C—C═C—, four such as —C═C—C═C—C═C—C═C, or more). In certain embodiments of the first-third embodiment disclosed herein, the U moiety contains two carbon-carbon double bonds in a conjugated configuration. In other embodiments of the first-third embodiments, the U moiety contains more than two carbon-carbon double bonds in a conjugated configuration (e.g., 3, 4, or more).

In certain embodiments of the first-third embodiments, the U moiety of formula I and II is substituted with at least one heteroatom selected from O (oxygen), S (sulfur), NR (nitrogen with R substituent). When U is substituted with at least one heteroatom, a carbon of SP in formula I or II is directly bonded to one of the carbons of U rather than to S, O, or the N of NR.

In certain embodiments of the first-third embodiments, the U moiety of formula I and formula II comprises a conjugated bond-containing cyclic moiety. The phrase conjugated bond-containing cyclic moiety should be understood to refer to a moiety that contains both a cyclic moiety (either aromatic or non-aromatic) and a carbon-carbon double bond in conjugated configuration. Thus, the phrase conjugated bond-containing cyclic moiety encompasses conjugated aromatics (e.g., vinylbenzene) and conjugated non-aromatic cyclics (e.g., cyclopentadiene). In certain embodiments of the first-third embodiments, the U moiety of formula I and formula II is selected from: (a) conjugated aromatics having at least one vinyl substituent, the conjugated aromatic compounds optionally containing at least one heteroatom selected from O, S, or N; (b) conjugated non-aromatic cyclics optionally containing at least one heteroatom selected from O, S, or NR (NR having the definition as discussed above), and (c) conjugated aliphatics optionally containing at least one heteroatom selected from O, S, or NR (NR having the definition as discussed above). In certain embodiments of the first-third embodiments, the U moiety of formula I and formula II is selected from (a). In certain embodiments of the first-third embodiments, the U moiety of formula I and formula II is selected from (b). In certain embodiments of the first-third embodiments, the U moiety of formula I and formula II is selected from (c). The position of the at least two carbon-carbon double bonds in conjugated configuration within the U moiety may vary in terms of the number of carbon atoms separating the conjugated bonds from the Si atom. In certain embodiments of the first-third embodiments, the at least two carbon-carbon double bonds in conjugated configuration are positioned at the terminus of the U moiety (i.e., at the end away from SP).

In those embodiments of the first-third embodiments wherein the U moiety of formula I and formula II is selected from conjugated aromatics having at least one vinyl substituent, the conjugated aromatic compounds optionally containing at least one heteroatom selected from O, S, or N, the conjugated aromatic having at least one vinyl substituent preferably comprises 8-22 carbon atoms, more preferably 8-16 carbon atoms. In certain embodiments of the first-third embodiments, the at least one heteroatom of the conjugated aromatic compound is selected from O, N and 5; non-limiting examples of such heteroaromatic compounds include furan, thiopene, pyrrole, isoxaazole, pyridine, pyrazine, benzthiazole, phthalazine, and phenazine. By using the term conjugated aromatic compound, it is meant to refer to the "conjugated" nature of the double bonds or pi-electrons in an aromatic ring such as benzene or its corresponding moiety phenyl. Since an aromatic compound can be understood to inherently include conjugated double bonds, conjugated aromatics having at least one vinyl substituent could also be described as aromatics having at least one vinyl substituent. Non-limiting examples of a U moiety of formula I and II selected from (a) and suitable for use in certain embodiments of the first-third embodiments include vinylbenzene, p-methylvinylbenzene, alpha-methylvinylbenzene, vinylnaphthalene, and vinylanthracene. In certain embodiments of the first-third embodiments, the U moiety of formula I and II is selected from (a) but does not include any heteroatom in its conjugated aromatic portion. In certain embodiments of the first-third embodiments, the U moiety of formula I and II is selected from (a) and includes at least one heteroatom selected from O, N and S in its conjugated aromatic portion. According to certain embodiments of the first-third embodiments, where the U moiety of formula I and formula II includes a conjugated aromatic having at least one vinyl substituent with at least one heteroatom selected from O, N and S, the vinyl group can be understood as being conjugated to a carbon-carbon double bond.

In those embodiments of the first-third embodiments wherein the U moiety of formula I and formula II is selected from conjugated non-aromatic cyclics optionally containing at least one heteroatom selected from O, S and NR, the conjugated non-aromatic cyclic moiety preferably comprises 5-20 carbon atoms, more preferably 5-20 carbon atoms. In certain embodiments of the first-third embodiments wherein the U moiety of formula I and formula II is selected from conjugated non-aromatic cyclics optionally containing at least one heteroatom selected from O, S and NR, the SP spacer is bonded to a ring carbon of the non-aromatic cyclic that is not involved in any double bonds. In other embodiments of the first-third embodiments wherein the U moiety of formula I and formula II is selected from conjugated non-aromatic cyclics optionally containing at least one heteroatom selected from O, S and NR, the SP spacer is bonded to a ring carbon of the non-aromatic cyclic that is involved in a double bond (i.e., within the ring). Non-limiting examples of a U moiety of formula I and formula II selected from (b) and suitable for use in the embodiments of the first-third embodiments include 1,3-cyclopentadiene, methylcyclopentadiene, 1,3-cyclohexadiene, methylcyclohexadiene, 1,3-cycloheptadiene, 1,3-cyclooctadiene, 1,3-cyclononadiene, and 1,3-cyclodecadiene. In certain embodiments of the first-third embodiments, the U moiety of formula I and formula II is selected from (b) and comprises 1,3-cyclopentadiene. In certain embodiments of the first-third embodiments, the U moiety of formula I and formula II is selected from (b) and does not include any heteroatom in its cyclic portion. In certain embodiments of the first-third embodiments, the U moiety of formula I and II is selected from (b) and includes at least one heteroatom selected from O, N and S in its cyclic portion.

In those embodiments of the first-third embodiments wherein the U moiety of formula I and formula II is selected from conjugated aliphatics optionally substituted with at least one heteroatom selected from O, S, or NR, the conjugated aliphatic preferably comprises 4-20 carbon atoms, more preferably 4-10 or 4-6 carbon atoms. The conjugated aliphatic of option (c) may also be described as a conjugated diene since it contains two carbon-carbon double bonds in a conjugated configuration. According to the first-third embodiments, the conjugated aliphatic may be branched or unbranched (i.e., linear). Non limiting examples of a U moiety of formula I and formula II selected from (c) and suitable for use in the embodiments of the first-third embodiments include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 3-methyl-1,3-pentadiene, 4-methyl-1,3-pentadiene, and 2,4-hexadiene. Preferably, the spacing group (SP) is bonded to the conjugated aliphatic moiety at the end of the molecule furthest from the conjugated bonds, e.g., for 1,3-pentadiene the bonding of the spacing group would be to the 5th carbon. In certain embodiments of the first-third embodiments, the U moiety of formula I and II is selected from (c) and does not include any heteroatom. In certain embodiments of the first-third embodiments, the U moiety of formula I and II is selected from (c) and includes at least one heteroatom selected from O, S, or NR.

Properties of the Terminal-Functionalized Polymer of Formula I

The properties of the terminal-functionalized polymer of formula I may vary. Properties may be determined by the methods discussed below in the Examples section. In certain embodiments of the first embodiment, the terminal-functionalized polymer has a number average molecular weight (Mn) of 50,000-800,000 grams/mole, preferably 70,000-400,000 grams/mole. In certain embodiments of the first embodiment, the terminal-functionalized polymer has a weight average molecular weight (Mw) of 50,000-900,000 grams/mole, preferably 70,000-500,000 grams/mole. In certain embodiments of the first embodiment, the terminal-functionalized polymer has a peak average molecular weight (Mp) of 50,000-800,000 grams/mole, preferably 70,000-400,000 grams/mole. In certain embodiments of the first embodiment, the terminal-functionalized polymer has a polydispersity (Mw/Mn) of 1-3 (e.g., 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3), preferably 1-2. In certain embodiments of the first embodiment, the terminal-functionalized polymer has a Tg of −90 to 0° C., preferably −60 to 0° C.

Polymer Chain

As discussed above, the first embodiment disclosed herein is directed to a terminal-functionalized polymer having a structure according to formula I: $(P)_n Si(R)_k(OR)_m$—SP—U wherein P is a polymer chain comprising at least one type of conjugated diene monomer and optionally at least one type of vinyl aromatic monomer. As also discussed above, the second embodiment disclosed herein is directed to a process for preparing a terminal-functionalized polymer, the process comprising reacting the live end of a polymer chain with a functionalizing compound having formula II, wherein the polymer chain comprises at least one type of conjugated diene monomer and optionally at least one type of vinyl aromatic monomer.

As those of skill in the art understand, a conjugated diene is a compound that has two double carbon-carbon bonds (i.e., two —C=C— bonds) that are separated by a single bond (i.e., —C—C—); thus, a conjugated diene will contain at least one —C=C—C=C— moiety. The particular structure of the conjugated diene monomer used to prepare the polymer chain or contained within the polymer chain of the first-third embodiments disclosed herein can vary. According to the first-third embodiments, one or more than one type of conjugated diene monomer can be utilized. By referring herein to one or more than one type of conjugated diene monomer is meant that the conjugated diene monomers may comprise all one formula or a mixture of formulas. As a non-limiting example, two types of conjugated diene monomers could encompass a combination of 1,3-butadiene and isoprene. In certain embodiments of the first-third embodiments disclosed herein, the conjugated diene monomer comprises at least one of 1,3-butadiene; isoprene; 1-3-pentadiene; 2,3-dimethyl-1,3-butadiene; 2-ethyl-1,3-butadiene; 2-methyl-1,3-pentadiene; 3-methyl-1,3-pentadiene; 4-methyl-1,3-pentadiene; 2,4-hexadiene; 1,3-hexadiene; 1,3-cyclopentadiene; 1,3-cyclohexadiene; 1,3-cycloheptadiene; or 1,3-cyclooctadiene. In certain embodiments of the first-third embodiments, the conjugated diene monomer comprises 1,3-butadiene. In certain embodiments of the first-third embodiments disclosed herein, the polymer chain further comprises at least one type of vinyl aromatic monomer, i.e., in addition to the conjugated diene monomer. In certain embodiments of the first-third embodiments disclosed herein, the at least one type of vinyl aromatic monomer of the polymer chain comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one type vinyl aromatic monomer of the polymer chain comprises styrene. In certain embodiments of the first-third embodiments disclosed herein, the polymer chain comprises 1,3-butadiene optionally in combination with styrene. In certain embodiments of the first-third embodiments wherein the polymer chain (or the resulting terminal-functionalized polymer) comprises at least one conjugated diene monomer in combination with at least one type of vinyl aromatic monomer, they are utilized at a weight ratio of 95:5 to 50:50, including 95:5 to 65:35. In certain embodiments of the first-third embodiments wherein the polymer chain comprises a combination of 1,3-butadiene and styrene monomers, the styrene content of the polymer chain (or the resulting terminal-functionalized polymer) is about 10 to about 50% of weight of the total monomer content (i.e., 1,3-butadiene+styrene), including 10-50% by weight, about 18 to about 40% by weight, and 18-40% by weight. In certain embodiments of the first-third embodiments wherein the polymer chain comprises a combination of 1,3-butadiene and styrene, the polymer chain (or the resulting terminal-functionalized polymer) has a microstructure with about 8 to about 99% by mass vinyl bonds (1,2-vinyl) in the butadiene portion, including 8-99%, about 10 to about 60% and 10-60% by weight. The vinyl bond content in the butadiene portion of a polymer chain or the resulting terminal-functionalized polymer can be determined by $H^1$-NMR and $C^{13}$-NMR (e.g., using a 300 MHz Gemini 300 NMR Spectrometer System (Varian).

Processes for Preparing the Terminal-Functionalized Polymer

As discussed above, the third embodiment disclosed herein is directed to a process for preparing a terminal-functionalized polymer. The process comprises reacting the live end of a polymer chain with a functionalizing compound having formula II, wherein the polymer chain comprises at least one type of conjugated diene monomer and optionally at least one type of vinyl aromatic monomer. The functionalizing compound having formula II is as discussed above. The polymer chain (i.e., the live end of a polymer chain which is reacted with the functionalizing compound having formula II), may be prepared by various polymerization methods. Since the live end of the polymer chain is reactive, it is referred to herein as a reactive polymer. As discussed in more detail below, various types of monomer(s), catalyst(s) and solvent(s) can be utilized in preparing the reactive polymer and a reactive polymer includes one initiated by an anionic initiator. The reactive polymer can also be described as a living polymer. The description herein as to processes for preparation of a reactive polymer or polymer chain with a live end should be understood to apply to the first and second embodiments disclosed herein in so much as the terminal-functional polymer having formula I or live end of a polymer chain with a functionalizing compound having formula II may be prepared according to such processes.

In certain embodiments of the third embodiment disclosed herein, the reactive polymer is formed by anionic polymerization. Anionic polymerization of conjugated diene monomers generally involves the use of an anionic initiator in combination with the monomer(s) and an optional solvent, the general process of which (i.e., other than the use of the functionalizing compound disclosed herein) is well known to those having skill in the art. Generally, the monomer or monomers are polymerized according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, and emulsion polymerization; in solution polymerization, the concentration of the monomer(s) in the solution is preferably within a range of 5 to 50% by mass, more preferably 10 to 30% by mass. The polymerization system is not particularly limited and may be a batch system or a continuous system. In certain embodiments of the third embodiment disclosed herein, an anionic polymerization is conducted utilizing an anionic initiator, generally an organic alkaline metal compound, preferably a lithium-containing compound. Examples of lithium-containing compounds useful as anionic initiators include, but are not limited to, hydrocarbyl lithium compounds, lithium amide compounds, and similar sodium compounds. In certain embodiments of the third embodiment disclosed herein, the amount of the lithium compound used as the anionic initiator is preferably within a range of 0.2 to 20 millimoles per 100 g of the monomer. In certain embodiments of the third embodiment, a functionalized initiator is utilized. Non-limiting examples of functionalized initiators include organic alkaline metal compounds (e.g., an organolithium compound) that additionally include one or more heteroatoms (e.g., nitrogen, oxygen, boron, silicon, sulfur, tin, and phosphorus atoms) or heterocyclic groups containing the foregoing, frequently one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578,542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference. In certain preferable embodiments when a functional initiator is utilized, the functional group added by the initiator is different from the functional group added by the functionalizing compounds disclosed herein.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. In certain embodiments of the third embodiment disclosed herein, the anionic polymerization is conducted in the absence of lanthanide compounds such as those used in coordination catalyst systems. Generally, the anionic polymerization is conducted using monomers in a hydrocarbon solvent inactive to the polymerization reaction, examples of which include hydrocarbon solvents such as aromatic hydrocarbon, aliphatic hydrocarbon, or cycloaliphatic hydrocarbon. Non-limiting examples of hydrocarbon solvents inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof.

In certain embodiments of the third embodiment, the anionic polymerization process is carried out in the presence of a randomizer. The randomizer can control the microstructure of the resulting polymer, and has an action such that the 1,2-bond content in the butadiene unit (or butadiene portion) of the polymer using, for example, 1,3-butadiene as a monomer is controlled, and butadiene units and styrene units in the copolymer using 1,3-butadiene and styrene as a monomer are randomized, or the like. Non-limiting examples of the randomizer include dimethoxybenzene, tetrahydrofuran, linear and cyclic oligomeric oxolanyl alkanes such as 2,2-bis(2'-tetrahydrofuryl)propane, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mole of the organic alkaline metal compound as a polymerization initiator.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

According to the processes of the third embodiment disclosed herein, various conjugated diene monomers can be utilized to prepare the reactive polymer, as discussed above. Similarly, according to the processes of the third embodiment, when the reactive polymer further comprises at least one type of vinyl aromatic monomer) (i.e., in addition to the conjugated diene monomer), various vinyl aromatic monomers can be utilized, as also discussed above.

According to the process of the third embodiment disclosed herein, once a desired conversion of monomer(s) is achieved and end functionalization with the functionalizing compound has taken place, the polymerization can be stopped by terminating or coupling. In certain embodiments of the third embodiment, the polymerization is terminated by protonating the "living" end functionalized polymer by adding a compound that can donate a proton to the living end (i.e., a proton source). Non-limiting examples include water, alcohols (e.g., C1-C4 alcohols such as isopropyl and methyl alcohol), and any mixtures thereof. In certain embodiments of the third embodiment disclosed herein, after the polymerization has been stopped or quenched, the end functionalized polymer is recovered by utilizing conventional procedures of desolventization and/or drying. For instance, the polymer may be isolated from the solution by coagulation of the polymerization mixture with an alcohol such as methanol, ethanol, or isopropanol, followed by isolation, or by steam distillation of the solvent and the unreacted monomer, followed by isolation. The isolated polymer is then dried to remove residual amounts of solvent and water. Alternatively, the polymer may be isolated from the polymerization mixture by evaporating the solvent, such as by directly drum drying the polymerization cement.

Rubber Compositions

As discussed above, the second embodiment disclosed herein is directed to a rubber composition comprising up to 100 parts of the terminal-functionalized polymer of the first embodiment. As also discussed above, the rubber composition of the second embodiment comprises (includes) 5 to 200 phr of reinforcing filler comprising at least one of carbon black or silica. It should also be understood that the terminal-functionalized polymer resulting from the processes of the third embodiment disclosed herein can be utilized in rubber compositions in a similar manner. Accordingly, a fourth embodiment disclosed herein is directed to a rubber composition comprising up to 100 parts of the terminal-functionalized polymer resulting from the process of the third embodiment. The below description of the rubber composition of the second embodiment should be understood to apply equally to this fourth embodiment, as if fully set forth below with respect to that fourth embodiment.

In certain embodiments of the second and fourth embodiments, the rubber composition comprises 10 to 100 parts of the terminal-functionalized polymer (i.e., of the first embodiment or resulting from the process of the third embodiment) and 0-90 phr of at least one additional rubber. In certain embodiments of the second and fourth embodiments, the rubber composition comprises up to 100 parts of the terminal-functionalized polymer (e.g., 1 phr, 5 phr, 10 phr, 20 phr, 30 phr, 40 phr, 50 phr, 60 phr, 70 phr, 80 phr, 90 phr, 95 phr, 100 phr) and 0-99 phr of at least one additional rubber (e.g., 1 phr, 5 phr, 10 phr, 20 phr, 30 phr, 40 phr, 50 phr, 60 phr, 70 phr, 80 phr, 90 phr, 95 phr, 100 phr) with the total amount of terminal-functionalized polymer and any additional rubbers comprising 100 parts or 100 phr; in certain such embodiments, the amount of the terminal-functionalized polymer comprises 5-100 phr, 10-100 phr, 20-100 phr, 30-100 phr, 40-100 phr, 5-90 phr, 5-90 phr, 10-90 phr, 20-90 phr, 30-90 phr, 40-90 phr, 5-80 phr, 10-80 phr, 20-80 phr, 30-80 phr, 40-80 phr, 5-70 phr, 10-70 phr, 20-70 phr, 30-70 phr, 40-70 phr, 5-60 phr, 10-60 phr, 20-60 phr, 30-60 phr, 40-60 phr, 5-50 phr, 10-50 phr, 20-50 phr, 30-50 phr, 40-50 phr. Suitable rubbers for use as the at least one additional rubber in the rubber compositions of certain embodiments of the second and fourth embodiments disclosed herein are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof. Examples of fluorinated rubber include perfluoroelastomer rubber, fluoroelastomer, fluorosilicone, tetrafluoroethylene-propylene rubber, and combinations thereof. In certain embodiments of the second and fourth embodiments, the at least one additional rubber comprises at least one conjugated diene monomer-containing rubber; in certain such embodiments, the at least one additional rubber comprises at least one of: styrene-butadiene copolymer, polybutadiene (preferably high-cis), natural rubber, polyisoprene, butyl rubber, neoprene, styrene-isoprene rubber, butadiene-isoprene rubber, styrene-isoprene-butadiene rubber, or EPDM rubber. In certain embodiments of the second and fourth embodiments, the at least one additional rubber comprises at least one of: styrene-butadiene copolymer, polybutadiene (preferably high-cis), natural rubber, or polyisoprene. In certain embodiments of the second and fourth embodiments, the at least one additional rubber consists of at least one of: styrene-butadiene copolymer, polybutadiene (preferably high-cis), natural rubber, or polyisoprene.

Reinforcing Fillers

As discussed above, the rubber composition of the second embodiment comprises (includes) 5 to 200 phr of reinforcing filler comprising at least one of carbon black or silica. In certain embodiments of the fourth embodiment, the rubber composition includes (further comprises) 5 to 200 phr of reinforcing filler; in certain such embodiments, this reinforcing filler comprises at least one of carbon black or silica.

The term "reinforcing filler" is used herein to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments, the term "reinforcing filler" is alternatively or additionally used to refer to a particulate material that has a particle size of about 10 nm up to about 1000 nm, including 10 nm up to 1000 nm, about 10 nm up to about 50 nm, and 10 nm up to 50 nm. In certain embodiments of the second and fourth embodiments, the total amount of at least one reinforcing filler is including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, or 35 to 80 phr.

Silica Fillers

Suitable silica fillers for use in certain embodiments of the rubber compositions of the second and fourth embodiments disclosed herein are well known. Non-limiting examples of silica fillers suitable for use in certain embodiments of the second and fourth embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of second and fourth embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the second and fourth embodiments disclosed herein, the rubber composition comprises a silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the second and fourth embodiments disclosed herein, the rubber composition comprises silica filler having a pH of about 5.5 to about 7 or slightly over 7, preferably about 5.5 to about 6.8. Some of the commercially available silica fillers which can be used in the rubber compositions of certain embodiments of the second and fourth embodiments disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165 MP), and J. M. Huber Corporation.

In certain embodiments of the second and fourth embodiments disclosed herein, the rubber composition comprises 5 to 200 phr (e.g., 5 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, 200 phr), 5 to 150 phr, 5 to 125 phr, 5 to 100 phr, 10 to 200 phr, 10 to 150 phr, 10 to 125 phr, 10 to 100 phr, 20 to 200 phr, 20 to 150 phr, 20 to 125 phr, or 20 to 100 phr of at least one silica filler. One or more than one silica may be utilized. When more than one silica filler is utilized, the foregoing amounts should be understood to refer to the total amount of all silica fillers.

In certain embodiments of the second and fourth embodiments disclosed herein, the silica filler comprises a silica that has been pre-reacted with a silica coupling agent; preferably the pre-treated silica comprises a silica that has been pre-treated with a silane-containing silica coupling agent.

Silica Coupling Agents

In certain embodiments of the second and fourth embodiments disclosed herein, one or more silica coupling agents is utilized in the rubber composition. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processibility and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the second and fourth embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the second and fourth embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS—R^3—Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^6—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the second and fourth embodiments disclosed herein include, but are not limited to, octyltriethoxysilane, octyltrimethoxysilane, trimethylethoxysilane, cyclohexyltriethoxysilane, isobutyltriethoxysilane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the second and fourth embodiments disclosed herein include bis(trialkoxysilylorgano) disulfides and bis(trialkoxysilylorgano)tetrasulfides. Specific non-limiting examples of bis(trialkoxysilylorgano)disulfides suitable for use in certain exemplary embodiments of the second and fourth embodiments disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl) disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano) tetrasulfide silica coupling agents suitable for use in certain embodiments of the second and fourth embodiments disclosed herein include, but are not limited to, bis(3-triethoxysilylpropyl)tetrasulfide, bis(2-triethoxysilylethyl) tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the second and fourth embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the second and fourth embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the second and fourth embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., about 5 to about 200 phr, including 5 to 200 phr, about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr about 5 to about 200 phr, including about 25 to about 150 phr, about 35 to 150 phr, about 25 to about 125 phr, about 25 to about 100 phr, about 25 to about 80 phr, about 35 to about 125 phr, about 35 to about 100 phr, and about 35 to about 80 phr).

When a silica coupling agent is utilized in a rubber composition according to the second or fourth embodiments disclosed herein, the amount used may vary. In certain embodiments of the second and fourth embodiments disclosed herein, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the second and fourth embodiments disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Carbon Black

In certain embodiments of the second and fourth embodiments disclosed herein, a carbon black filler is utilized in the rubber composition. Most (but not all) carbon blacks are reinforcing fillers. In those embodiments of the second and fourth embodiments that include one or more carbon blacks, the total amount of carbon black and any other reinforcing filler (e.g., silica filler) is about 10 to about 200 phr (including 10 to 200 phr). In certain embodiments of the second and fourth embodiments disclosed herein, the rubber composition comprises 5 to 200 phr (e.g., 5 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, 200 phr), 5 to 150 phr, 5 to 125 phr, 5 to 100 phr, 10 to 200 phr, 10 to 150 phr, 10 to 125 phr, 10 to 100 phr, 20 to 200 phr, 20 to 150 phr, 20 to 125 phr, or 20 to 100 phr of at least one carbon black filler. One or more than one carbon black filler may be utilized. When more than one carbon black filler is utilized, the foregoing amounts should be understood to refer to the total amount of all carbon black fillers. In certain embodiments of the second and fourth embodiments disclosed herein, carbon black is included in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the second and fourth embodiments disclosed herein, the carbon black comprises no more than about 30% by weight (including no more than 30% by weight) of the total reinforcing filler in the rubber composition. In certain embodiments of the second and fourth embodiments disclosed herein, the rubber composition comprises about 5 to about 100 phr (including 5 to 100 phr) of one or more carbon blacks. Generally, suitable carbon black for use in certain embodiments of the second and fourth embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the second and fourth embodiments disclosed herein, the rubber composition includes a mixture of two or more of the foregoing blacks. Typical suitable carbon blacks for use in certain embodiments of the second and fourth embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Fillers

In certain embodiments of the second and fourth embodiments, the at least one reinforcing filler includes at least one filler other than carbon black and/or silica. In certain embodiments of the second and fourth embodiments, the at least one reinforcing filler includes at least one filler in addition to carbon black and/or silica. Non-limiting examples of suitable additional reinforcing fillers for use in certain embodiments of the second and fourth embodiments disclosed herein include, but are not limited to, alumina, aluminum hydroxide, clay, magnesium hydroxide, boron nitride, aluminum nitride, titanium dioxide, reinforcing zinc oxide, and combinations thereof. In certain embodiments of the second and fourth embodiments, at least one inorganic filler in addition to the silica filler and the optional carbon black is utilized. Suitable inorganic fillers for use in certain embodiments of the second and fourth embodiments disclosed herein are not particularly limited and non-limiting examples include: aluminum hydroxide, talc, clay, alumina ($Al_2O_3$), aluminum hydrate ($Al_2O_3.H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

Cure Package

In certain embodiments of the second and fourth embodiments disclosed herein, the rubber composition includes (further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the second and fourth embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in certain embodiments of the second and fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the second and fourth embodiments disclosed herein include, but are not limited to, thiazole vulcanization accelerators, such as 2-mercaptobenzothiazole, 2,2'-dithiobis (benzothiazole) (MBTS), N-cyclohexyl-2-benzothiazolesulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

Various other ingredients that may optionally be added to the rubber compositions of the second and fourth embodiments disclosed herein are well known to those of skill in the art and include processing oils, waxes, processing aids, tackifying resins, reinforcing resins, and peptizers.

Various types of processing and extender oils may be utilized, including, but not limited to aromatic, naphthenic, and low PCA oils, as discussed above. Generally, for most applications the total amount of oil used (processing oil and any extender oil) in the rubber compositions disclosed herein ranges from about 1 to about 70 phr, including 1 to 70 phr, about 2 to about 60 phr, 2 to 60 phr, about 3 to about 50 phr, and 3 to 50 phr. However, in certain applications, the total amount of oil used (processing oil and any extender oil) in the rubber compositions and methods disclosed herein is much higher and ranges up to about 175 phr, including up to 175 phr, up to about 150 phr, up to 150 phr, up to about 100 phr, and up to 100 phr.

Methods for Preparing Rubber Compositions

Rubber compositions according to the second and fourth embodiments disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the second and fourth embodiments, one non-productive master-batch mixing stage may be used in preparing the rubber composition. In certain embodiments of the second and fourth embodiments, more than one non-productive master-batch mixing stage is used. In certain embodiments of the second and fourth embodiments where silica and silica coupler is utilized, more than one non-productive master-batch mixing stage is used and at least a portion of the silica filler is added in a second non-productive master-batch mixing stage (also described as a re-mill stage); in certain such embodiments, all silica coupling agent is added only in the second non-productive master-batch mixing stage (along with at least a portion of the silica filler) and no silica coupling agent is added in an initial non-productive master-batch mixing stage.

In certain embodiments of the second and fourth embodiments, the rubber composition is prepared by a process with the non-productive master batch mixing stage(s) conducted at a temperature of about 130° C. to about 200° C. In certain embodiments of the second and fourth embodiments, the rubber composition is prepared by a process with the final productive mixing stage conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that functionalizing compounds having formula II other than those used below in Examples 2 and 3 can be utilized to prepare terminal-functionalized polymers having formula I. It should also be understood that other terminal-functionalized polymers having formula I can be utilized in rubber compositions along with ingredients (e.g., additional rubber(s), fillers, cure package ingredients) that differ in relative amount, composition, or both from those used in the examples (i.e., as fully as disclosed in the preceding paragraphs).

Examples 1-3: Styrene-butadiene polymers were produced according the following procedure. To a two gallon $N_2$ purged reactor equipped with a stirrer was added 1.384 kg of hexane, 0.454 kg of 33.0 weight % styrene in hexane, and 3.102 kg of 19.3 weight % butadiene in hexane. The reactor was charged with 3.6 milliliters of n-butyl lithium (1.6 Molar) in hexane, followed 1.25 milliliters of 2,2-bis (2'-tetrahydrofuryl)propane (1.6 Molar in hexane), and the reactor jacket was heated to 50° C. After 33 minutes, the batch temperature peaked at 65.2° C. After an additional 30 minutes, the polymer cement was dropped into dried 28-oz glass bottles. To each glass bottle was added one of: 0.5 milliliters of isopropanol (Example 1), 0.14 milliliters of 3.48 Molar styrylethyltrimethoxysilane in hexane (Example 2), or 0.13 milliliters of 3.66 Molar 3-cyclopentadienylpropyl)triethoxysilane (Example 3). The glass bottles were maintained in a 50° C. water bath for 30 minutes, and thereafter the polymer cements were (separately) dropped into isopropanol containing butylated hydroxytoluene (BHT), and drum dried. The polymers of Examples 1-3 contained 20% by weight styrene (based upon the total weight of styrene and 1,3-butadiene) and had a vinyl bond content (butadiene portion) of 55%, and showed the following properties as set forth below in Table 1. The polymer of Example 1 is not functionalized and can be considered a control. The polymers of Examples 2 and 3 are both terminal-functionalized according to the present disclosure.

TABLE 1

| Example | Mn | Mw | Mp | MWD | % coupling | Tg (° C.) |
|---|---|---|---|---|---|---|
| 1 | 117691 | 122721 | 121831 | 1.04 | 0.0 | −37.69 |
| 2 | 143151 | 183337 | 117059 | 1.281 | 37.35 | −39.62 |
| 3 | 159266 | 210261 | 228606 | 1.320 | 54.20 | −39.15 |

In Table 1, Mn indicates the number average molecular weight in grams/mole (by GPC), Mw indicates the weight average molecular weight in grams/mole (by GPC), Mp indicates the peak molecular weight in grams/mole (by GPC), MWD indicates the molecular weight dispersion or polydispersity (calculated by dividing Mw/Mn), and Tg indicates the glass transition temperature. Generally, the Mn, Mw and Mp of these polymers may be determined by using gel permeation chromatography (GPC) calibrated with polystyrene standards and Mark-Houwink constants for the polymer in question. The % coupling was also measured by GPC.

Examples 4-6 and 7-9: The polymers produced according to Examples 1-3 were utilized to prepare rubber compositions according to the formulas provided in Tables 2 and 3 below. As can be seen from a review of Tables 2 and 3, the rubber compositions of Examples 4-6 utilize carbon black (N343) as reinforcing filler and the rubber compositions of Examples 7-9 utilize silica (Hi-SIL from PPG) as reinforcing filler. The mixing procedure set forth in Table 4 was utilized in preparing the rubber compositions.

TABLE 2

| Ingredient | Example 4 | Example 5 | Example 6 |
|---|---|---|---|
| Masterbatch | | | |
| Polymer of Example 1 | 100 | 0 | 0 |
| Polymer of Example 2 | 0 | 100 | 0 |
| Polymer of Example 3 | 0 | 0 | 100 |
| Carbon black | 50 | 50 | 50 |
| Wax | 2 | 2 | 2 |

TABLE 2-continued

| Ingredient | Example 4 | Example 5 | Example 6 |
|---|---|---|---|
| Processing oil | 10 | 10 | 10 |
| Stearic acid | 2 | 2 | 2 |
| 6PPD | 0.95 | 0.95 | 0.95 |
| Final | | | |
| Sulfur | 1.5 | 1.5 | 1.5 |
| TBBS | 0.5 | 0.5 | 0.5 |
| MBTS | 0.5 | 0.5 | 0.5 |
| DPG | 0.3 | 0.3 | 0.3 |
| Zinc oxide | 2.5 | 2.5 | 2.5 |

TABLE 3

| Ingredient | Example 7 | Example 8 | Example 9 |
|---|---|---|---|
| Masterbatch | | | |
| Polymer of Example 1 | 80 | 0 | 0 |
| Polymer of Example 2 | 0 | 80 | 0 |
| Polymer of Example 3 | 0 | 0 | 80 |
| Natural rubber | 20 | 20 | 20 |
| Silica | 52.5 | 52.5 | 52.5 |
| Wax | 2 | 2 | 2 |
| Processing oil | 10 | 10 | 10 |
| Stearic acid | 2 | 2 | 2 |
| 6PPD | 0.95 | 0.95 | 0.95 |
| Remill | | | |
| Silica | 2.5 | 2.5 | 2.5 |
| Silane | 5 | 5 | 5 |
| Final | | | |
| Sulfur | 1.5 | 1.5 | 1.5 |
| TBBS | 0.7 | 0.7 | 0.7 |
| MBTS | 2 | 2 | 2 |
| DPG | 1.4 | 1.4 | 1.4 |
| Zinc oxide | 2.5 | 2.5 | 2.5 |

The mixing procedure set forth in Table 4 was utilized in preparing the rubber compositions of Examples 4-6 and 7-9.

TABLE 4

| Stage | Time | Condition |
|---|---|---|
| Mixing Parameters | | |
| Mixing for Silica Compositions | | |
| Master-Batch Stage 1 (initial temp: 120° C., rotor rpm started at 50) | 0 seconds<br>30 seconds | Charge polymers<br>Charge any oil, silica filler and other master-batch ingredients, increase rotor speed to 90 rpm<br>Drop based on max temperature of 165° C. or 5.5 minutes mixing (whichever comes first) |
| Remill Stage (initial temp: 130-135° C., rotor rpm at 50) | 0 seconds | Charge Master Batch and add remill ingredients<br>Drop based on max temperature of 150° C. or 3.5 minutes mixing (whichever comes first) |
| Final Batch Stage (initial temp: 65° C., rotor rpm at 45) | 0 seconds<br>0 seconds | Charge Remill<br>Charge curatives<br>Drop based on max temperature of 100° C. or 2.5 minutes mixing (whichever comes first) |
| Mixing for Carbon Black Compositions | | |
| Master-Batch Stage (initial temp: 130° C., rotor rpm started at 60) | 0 seconds<br>30 seconds | Charge polymers<br>Charge any oil, carbon black filler and other master-batch ingredients, increase rotor speed to 90 rpm<br>Drop based on max temperature of 165° C. or 5.5 minutes mixing (whichever comes first) |
| Final Batch Stage (initial temp: 65-70° C., rotor rpm at 45) | 0 seconds<br>0 seconds | Charge Remill<br>Charge curatives<br>Drop based on max temperature of 100° C. or 2.5 minutes mixing (whichever comes first) |

TABLE 4-continued

Mixing Parameters

| Stage | Time | Condition |
|---|---|---|
| *Mixing for Silica + Carbon Black Compositions* | | |
| Master-Batch Stage 1 (initial temp: 120° C., rotor rpm started at 70) | 0 seconds 30 seconds | Charge polymers Charge any oil, carbon black, portion of silica filler and other master-batch ingredients, increase rotor speed to 70 rpm Drop based on max temperature of 170° C. or 5.5 minutes mixing (whichever comes first) |
| Remill Stage (initial temp: 140° C., rotor rpm at 60) | 0 seconds | Charge Master Batch and add remill ingredients Drop based on max temperature of 140° C. or 2.0 minutes mixing (whichever comes first) |
| Final Batch Stage (initial temp: 60° C., rotor rpm at 40) | 0 seconds 0 seconds | Charge Remill Charge curatives Drop based on max temperature of 110° C. or 2.5 minutes mixing (whichever comes first) |

For each of the rubber compositions of Examples 4-6 and 7-9, the properties listed in Table 5 were determined as follows. Tan δ values were measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature of 60° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded. A rubber composition's tan δ at 60° C. is indicative of its rolling resistance when incorporated into a tire tread.

The Mooney viscosities disclosed herein are compound values (determined upon the compounded rubber composition) were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor starts. The Mooney viscosity was recorded for each sample as the torque at four minutes after the rotor started. Generally, a lower Mooney viscosity is beneficial. Therefore, a lower index value for Mooney viscosity can be considered advantageous.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

TABLE 5

| Carbon Black Rubber Compositions | | | |
|---|---|---|---|
| | ML1 + 4 | Tan δ at 60° C. | Bound rubber |
| Example 4 | 21.5 | 0.2055 | 9.91 |
| Example 5 | 72.4 | 0.1478 | 25.13 |
| Example 6 | 45.7 | 0.1366 | 24.94 |

As can be seen from the data of Table 5, the rubber compositions containing polymer which is terminal functionalized with a functionalizing compound having formula II (i.e., the compositions of Examples 5 and 6), exhibit improved properties, i.e., lower tan δ values and higher bound rubber values than the rubber composition containing polymer which is not terminal functionalized (i.e., the composition of Example 4). More specifically, the tan δ values for Examples 5 and 6 are more than 25% lower than for control Example 4, which is indicative of the compositions exhibiting lower rolling resistance if incorporated into a tire tread. The bound rubber values for Examples 5 and 6 are more than 200% higher than for control Example 4.

TABLE 6

| Silica Rubber Compositions | | | |
|---|---|---|---|
| | ML1 + 4 | Tan δ at 60° C. | Bound rubber |
| Example 7 | 18.1 | 0.1469 | 16.67 |
| Example 8 | 48.2 | 0.0751 | 64.96 |
| Example 9 | 37.5 | 0.1177 | 35.26 |

As can be seen from the data of Table 6, the rubber compositions containing polymer which is terminal functionalized with a functionalizing compound having formula II (i.e., the compositions of Examples 8 and 9), exhibit improved properties, i.e., lower tan δ values and higher bound rubber values than the rubber composition containing polymer which is not terminal functionalized (i.e., the composition of Example 7). More specifically, the tan δ values for Examples 8 and 9 are at least 20% lower (more than 40% lower for Example 8) than for control Example 7, which is indicative of the compositions exhibiting lower rolling resistance if incorporated into a tire tread. The bound rubber values for Examples 8 and 9 are more than 200% higher (more than 300% higher for Example 8) than for control Example 7.

Examples 10-12: The polymers produced according to Examples 1-3 are utilized to prepare rubber compositions according to the formulas provided in Table 7. As can be seen from a review of Table 7, the rubber compositions of Examples 10-12 utilize a combination of silica and carbon black as reinforcing filler (the fillers were the same as indicated above in Examples 4-6 and 7-9). The mixing procedure set forth in Table 4 (silica+carbon black) is utilized in preparing the rubber compositions. For each of the rubber compositions of Examples 10-12, the same properties as listed in Table 5 can be determined.

TABLE 7

| Ingredient | Example 10 | Example 11 | Example 12 |
|---|---|---|---|
| Masterbatch | | | |
| Polymer of Example 1 | 100 | 0 | 0 |
| Polymer of Example 2 | 0 | 100 | 0 |
| Polymer of Example 3 | 0 | 0 | 100 |
| Carbon black | 27 | 27 | 27 |
| Silica | 24.5 | 24.5 | 24.5 |
| Wax | 2 | 2 | 2 |
| Processing oil | 10 | 10 | 10 |
| Stearic acid | 2 | 2 | 2 |
| 6PPD | 0.95 | 0.95 | 0.95 |
| Remill | | | |
| Silica | 2.5 | 2.5 | 2.5 |
| Silane | 2.5 | 2.5 | 2.5 |
| Final | | | |
| Sulfur | 1.5 | 1.5 | 1.5 |
| TBBS | 0.6 | 0.6 | 0.6 |
| MBTS | 1.2 | 1.2 | 1.2 |
| DPG | 0.7 | 0.7 | 0.7 |
| Zinc oxide | 2.5 | 2.5 | 2.5 |

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A rubber composition comprising:
   (a) 5 to 100 parts of a terminal-functionalized polymer having a structure according to formula I $$(P)_n Si(R)_k(OR)_m\text{—SP—U} \qquad (I)$$ 

wherein P is a polymer chain comprising at least one type of conjugated diene monomer and optionally at least one type of vinyl aromatic monomer, n is an integer of 1-3, m is an integer of 0-2, k is an integer of 0 or 1, m+n+k=3, each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv)

SP is a spacer group having at least two carbon atoms and is optionally substituted with at least one heteroatom selected from S, O, or NR, and U is a moiety containing at least two carbon-carbon double bonds in a conjugated configuration and is optionally substituted with at least one heteroatom selected from O, S, or N, (b) 5 to 200 phr of at least one reinforcing filler comprising at least one of carbon black or silica.

2. The rubber composition of claim 1, wherein within the terminal-functionalized polymer U comprises a conjugated bond-containing cyclic moiety.

3. The rubber composition of claim 1, wherein within the terminal-functionalized polymer U comprises a moiety selected from
   (a) conjugated aromatics having at least one vinyl substituent, the conjugated aromatics optionally containing at least one heteroatom selected from O, S, or N,
   (b) conjugated non-aromatic cyclics optionally containing at least one heteroatom selected from O, S, or NR, and
   (c) conjugated aliphatics optionally having at least one heteroatom selected from O, S, or NR.

4. The rubber composition of claim 3, wherein within the terminal-functionalized polymer U comprises (a) having 8-22 carbon atoms.

5. The rubber composition of claim 3, wherein within the terminal-functionalized polymer U comprises (b) having 5-20 carbon atoms.

6. The rubber composition of claim 1, wherein within the terminal-functionalized polymer U comprises vinylbenzene.

7. The rubber composition of claim 1, wherein within the terminal-functionalized polymer U comprises cyclopentadiene.

8. The rubber composition of claim 1, wherein within the terminal-functionalized polymer the at least one type of conjugated diene monomer comprises 1,3-butadine.

9. The rubber composition of claim 1, further comprising at least one additional polymer selected from the group consisting of polybutadiene, styrene-butadiene copolymer, natural rubber, polyisoprene, and combinations thereof, wherein the total amount of (a) and the at least one additional polymer or copolymer is 100 parts.

10. The rubber composition of claim 1, wherein (b) comprises a combination of at least one carbon black and at least one silica.

11. The rubber composition of claim 10, wherein the at least one carbon black comprises 5 to 20% by weight of the reinforcing filler.

12. The rubber composition of claim 10, comprising 50 to 100 phr of the at least one carbon black.

13. A rubber composition comprising:
   (a) 10 to 90 parts of a terminal-functionalized polymer having a structure according to formula I

(I)

wherein P is a polymer chain comprising at least one type of conjugated diene monomer including 1,3-butadiene and optionally at least one type of vinyl aromatic monomer, n is an integer of 1-3, m is an integer of 0-2, k is an integer of 0 or 1, m+n+k=3, each R is independently selected from: (i) an alkyl group having 1 to 20 carbons, (ii) a cycloalkyl group having 3 to 20 carbons, (iii) an aryl group having 6 to 20 carbons, (iv) an alkylaryl group having 7 to 20 carbons, or (v) $SiR^1R^2R^3$ where each of $R^1$, $R^2$ and $R^3$ is independently selected from H, (i), (ii), (iii), or (iv)

SP is a spacer group having at least two carbon atoms and is optionally substituted with at least one heteroatom selected from S, O, or NR, and U is a moiety containing at least two carbon-carbon double bonds in a conjugated configuration, (b) 90 to 10 parts of at least one additional polymer selected from the group consisting of polybutadiene, styrene-butadiene copolymer, natural rubber, polyisoprene, and combinations thereof, wherein the total amount of (a) and the at least one additional polymer or copolymer is 100 parts, and (c) 50 to 150 phr of at least one reinforcing filler comprising at least one of carbon black or silica.

14. The rubber composition of claim 13, wherein within the terminal-functionalized polymer U comprises a conjugated bond-containing cyclic moiety.

15. The rubber composition of claim 13, wherein within the terminal-functionalized polymer U comprises a moiety selected from
   (a) conjugated aromatics having at least one vinyl substituent, the conjugated aromatics having 8-22 carbon atoms,
   (b) conjugated non-aromatic cyclics, and
   (c) conjugated aliphatics.

16. The rubber composition of claim 13, wherein within the terminal-functionalized polymer U comprises vinylbenzene.

17. The rubber composition of claim 13, wherein within the terminal-functionalized polymer U comprises or cyclopentadiene.

18. The rubber composition of claim 13, wherein (c) comprises a combination of at least one carbon black and at least one silica.

19. The rubber composition of claim 18, wherein the at least one carbon black comprises 5 to 20% by weight of the reinforcing filler.

20. The rubber composition of claim 18, comprising 50 to 100 phr of the at least one carbon black.

* * * * *